United States Patent
Adams et al.

(10) Patent No.: US 10,538,433 B2
(45) Date of Patent: Jan. 21, 2020

(54) ACTIVATED CARBON PRODUCTION AT BIOMASS-FUELED STEAM/ELECTRIC POWER PLANTS

(71) Applicants: Russel Mark Adams, Penryn, CA (US); John Wright Coulter Black, Markham (CA)

(72) Inventors: Russel Mark Adams, Penryn, CA (US); John Wright Coulter Black, Markham (CA)

(73) Assignee: ADVANCED ORGANIC METHODS LLC, Penryn, CA (US)

( * ) Notice: Subject to any disclaimer, the term of this patent is extended or adjusted under 35 U.S.C. 154(b) by 0 days.

(21) Appl. No.: 16/509,328

(22) Filed: Jul. 11, 2019

(65) Prior Publication Data

US 2019/0337809 A1    Nov. 7, 2019

Related U.S. Application Data

(63) Continuation-in-part of application No. 15/012,834, filed on Feb. 1, 2016, now abandoned.

(60) Provisional application No. 62/112,260, filed on Feb. 5, 2015.

(51) Int. Cl.
| | |
|---|---|
| *C01B 32/39* | (2017.01) |
| *F01K 11/02* | (2006.01) |
| *C01B 32/324* | (2017.01) |
| *B01J 6/00* | (2006.01) |
| *F01K 7/16* | (2006.01) |
| *C01B 32/336* | (2017.01) |

(52) U.S. Cl.
CPC .............. *C01B 32/39* (2017.08); *B01J 6/008* (2013.01); *C01B 32/324* (2017.08); *C01B 32/336* (2017.08); *F01K 7/16* (2013.01); *F01K 11/02* (2013.01)

(58) Field of Classification Search
CPC ..... C01B 32/39; C01B 32/324; C01B 32/336; F01K 11/02; F01K 7/16; B01J 6/008
USPC ..................................................... 422/187
See application file for complete search history.

(56) References Cited

U.S. PATENT DOCUMENTS

| | | | | |
|---|---|---|---|---|
| 4,287,838 | A * | 9/1981 | Frosch | F22B 31/0023 110/234 |
| 4,398,998 | A * | 8/1983 | Quame | B09B 3/00 110/234 |
| 6,669,822 | B1 * | 12/2003 | Fujimura | C10B 47/44 201/20 |
| 2010/0113267 | A1 * | 5/2010 | Srinivasachar | F01K 17/04 502/421 |

* cited by examiner

Primary Examiner — Huy Tram Nguyen
(74) Attorney, Agent, or Firm — Robert S. Smith

(57) ABSTRACT

A method and apparatus for producing activated carbon from biomass or other solid carbonaceous feed within a housing containing boiler components, by spatial separation of drying, pyrolysis and activation zones as the feed is conveyed across the bottom of the housing, such that the thermal requirements for drying, pyrolysis, and activation of the solid carbonaceous feed occur by direct radiation from the combustion flame located above the drying, pyrolysis and activation zones. The balance of the heat not required for drying, pyrolysis, and activation is used to vaporize and superheat steam as part of a conventional steam/electric power plant.

6 Claims, 1 Drawing Sheet

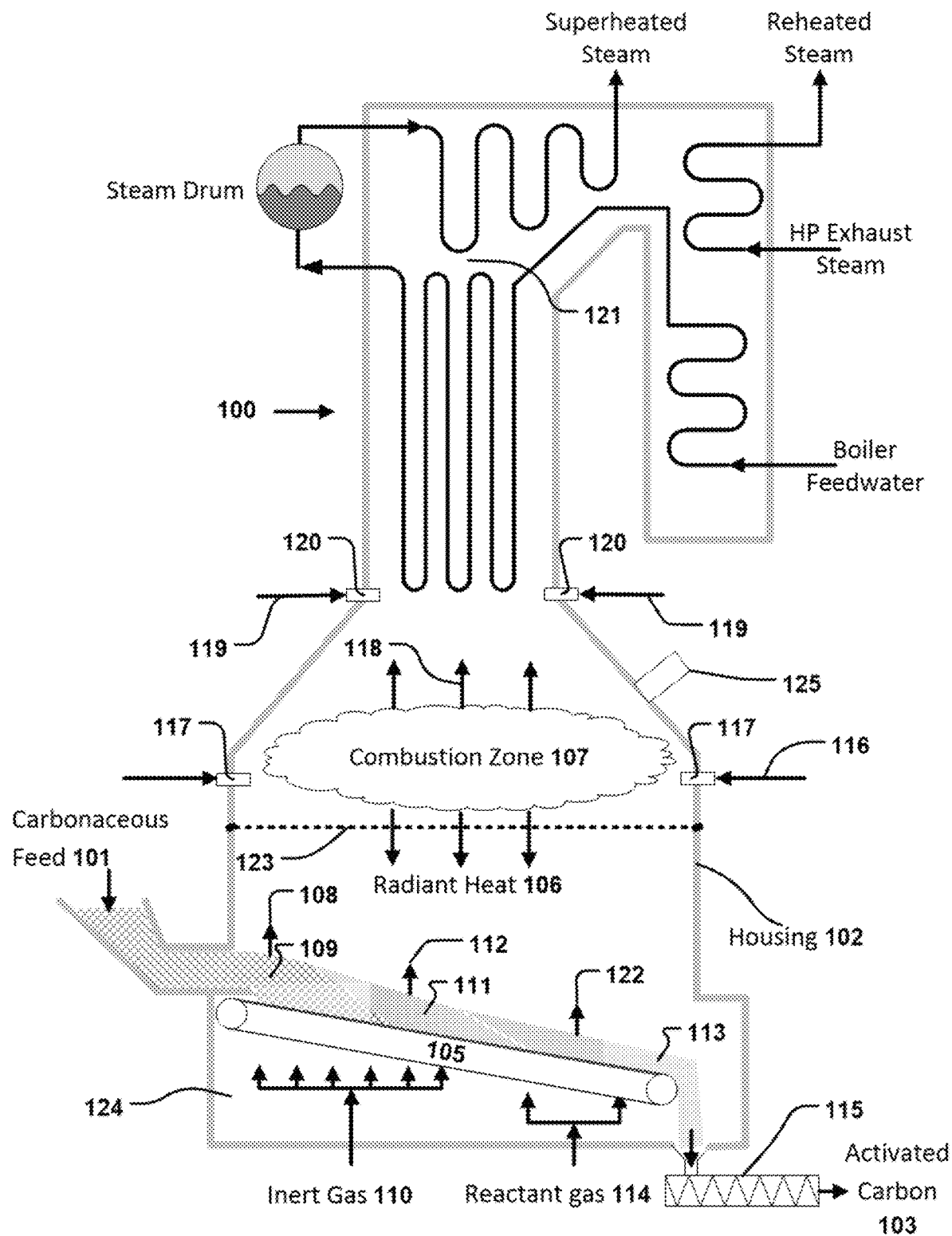

ACTIVATED CARBON PRODUCTION AT BIOMASS-FUELED STEAM/ELECTRIC POWER PLANTS

CROSS-REFERENCE TO RELATED APPLICATIONS

This application is a continuation in part of U.S. patent application Ser. No. 15/012,834 filed Feb. 1, 2016, which relies on the priority of U.S. Provisional Patent Application No. 62/112,260 filed Feb. 5, 2015.

TECHNICAL FIELD

The present invention is generally directed to a method and apparatus for integrated concurrent Rankine cycle electric power production and activated carbon production utilizing a common heat source to (1) heat water to produce superheated steam in a boiler system and (2) heat an activated carbon precursor in the absence of oxygen to the temperature at which the material dries and thermally decomposes to produce combustible gases and vapors and is further thermally processed with a reactant to produce activated carbon. The present invention is further directed to the synergistic utilization of the gases and vapors to augment the continuous operation of the overall process.

It will be understood that the term "boiler" as used herein refers to an integral device that includes (1) a furnace that burns solid fuel and/or combustible gases to produce heat and (2) uses the heat to produce steam by applying the heat energy to water. It will also be understood that "carbonaceous feed" and "solid fuel" as used herein includes but is not limited to biomass.

The manufacture of activated carbon utilizes pyrolysis as a first step. Pyrolysis is the thermal decomposition of materials at elevated temperatures in an inert atmosphere. It involves a change in chemical composition and is irreversible. In general, pyrolysis of organic substances produces volatile products and leaves a solid residue high in fixed carbon, called char. The process is used extensively in the chemical industry to produce many forms of carbon. One such example is coke produced from coal. Activation of char is accomplished by contact with a reactant gas such as steam at high temperatures. During activation, the reactant gas penetrates into the interior of the char particles, removing some of the carbon and leaving a lacework of very small pores. The pore surfaces of the activated carbon adsorb many constituents, such as mercury and color bodies. There are many uses of various grades of activated carbon in such areas as pollution control and food processing. Iodine Number is a common measure of activated carbon quality, roughly proportional to surface area per unit mass. Commercially sold activated carbon has an Iodine Number generally greater than 600.

Embodiments of the invention are suitable for retrofitting existing solid fueled power plants as well as constructing assemblies/plants that are initially intended to be an integrated Rankine cycle power plant and activated carbon production facility.

BACKGROUND OF THE INVENTION

A conventional solid fuel fired steam/electric power plant includes the following process steps:
(1) Providing a fuel yard where the fuel is received, stored and reclaimed.
(2) Preparing the fuel which may include drying, comminution, tramp removal, and screening.
(3) Further drying and thermally decomposing the fuel on a grate. The resulting combustible char, gases, and vaporized liquids are ignited and burned in the presence of excess air in a combustion section.
(4) Delivering heat from the combustion section to the boiler tubes for the generation of superheated steam from pressurized water.
(5) Moving the pressurized, superheated steam into a steam turbine where pressure and thermal energy are converted to mechanical energy by means of a Rankine cycle.
(6) Converting the mechanical energy into electrical energy via an electrical generator and transmission of that energy to the customer.
(7) Condensing the steam back to liquid water and purification of the water before returning it to the boiler system.
(8) Cleaning the gaseous products of combustion leaving the boiler system to remove particulate and gaseous contaminants prior to their discharge to atmosphere.

An activated carbon manufacturing facility includes the following process steps:
(1) Providing a feedstock yard where a solid carbonaceous material is received, stored and reclaimed.
(2) Preparing the feedstock which may include drying, comminution, tramp removal, and screening.
(3) Further drying and decomposing pyrolytically the feedstock by heating in the absence of oxygen to the temperature at which the material dries and thermally decomposes to produce combustible gases and vapors and a solid charcoal material (char) high in fixed carbon.
(4) Activating the char, where steam or other mild oxidizing agent is reacted with the char to increase its porosity. Pyrolysis and activation can take place in the same vessel. Combustion of the pyrolysis and activation off-gases provide some or all of the heat for pyrolysis and activation. The term "off-gases" as used herein means gases and vaporized liquids which are given off by a solid due to heat or reaction.
(5) Generating steam to react with the char.

There are commonalities between the biomass power production and activated carbon production technologies and there would appear to the economic benefits in sharing operations. For example, Srinivasachar in U.S. Pat. No. 7,981,835 teaches that feedstock handling and preparation can be shared by both technologies. Similarly, excess gases from the activated carbon production process can be returned for combustion in the boiler system and to be cleaned up in the existing power plant. The actual scope of process integration taught by Srinivasachar is limited.

Despite the commonalities, the prior art does not incorporate the respective two processes, namely the combination of the Rankine cycle steam generation with activated carbon production, within a single common housing and utilizing combustion to heat both (1) water to produce steam as well as (2) the activated carbon precursors. In addition, the prior art does not synergistically utilize the products of the pyrolysis process to augment the continuing overall process operation.

Both Majmudar U.S. Pat. No. 8,999,885 and Srinivasachar U.S. Pat. No. 7,981,835 teach the production of steam for power generation and also the production of activated carbon, however, in both patents, more emphasis is given to power generation. Majmudar suggests that the char separated from a partial oxidation or gasification reactor can be heated in a screw conveyor to a temperature between 400 and 1100° C. to activate the charcoal. However, it is known in the art that heat alone will not activate charcoal, particularly charcoal which has been exposed already to temperatures of 800° C. or higher in a biomass gasifier. In another embodiment taught in Majmudar, the char, preheated to similar temperatures in a screw conveyor, is then exposed to steam, the maximum temperature of which is unlikely to exceed 650° C. after being heated by gas turbine exhaust. Char activation is endothermic and the reaction mix would quickly cool before significant activation is accomplished. Even if it is assumed that the charcoal could be activated, the charcoal from a gasification reactor is very high in ash, typically 20 to 50% and even higher from some gasifiers. Under that scenario, the activated carbon would be of low quality. While much of the ash can be removed by an acid wash, as is suggested in Majmudar U.S. Pat. No. 8,999,885, there remains the pollution associated with such a process. That, combined with the low charcoal yield from gasification, typically less than 5% and in some gasifiers less than 1%, limits the economic attractiveness of the overall process.

Typically, one ton of biomass produces about one megawatt-hour of electric energy, which has a value of $30 to $40 when sold as baseline power. On the other hand, one ton of biomass can produce 0.1 to 0.15 tons of activated carbon which is worth about $2000 per ton, for an equivalent total value of $200 to $300 per ton of biomass. Accordingly, to ensure maximum viability, process integration must favor the production of activated carbon over power generation, which is not the case in either of the Majmudar U.S. Pat. No. 8,999,885 or Srinivasachar U.S. Pat. No. 7,981,835 patents. The present process maximizes the activated carbon yield while completely integrating char production and activation inside a single housing to optimize production for maximum economic benefit.

From the above, it is therefore seen that there exists a need in the art to overcome the deficiencies and limitations described herein and above.

SUMMARY OF THE INVENTION

The shortcomings of the prior art are overcome and additional advantages are provided in part by eliminating all ductwork and fans handling vaporized liquids. Vaporized liquids resulting from pyrolysis begin to condense at temperatures less than about 500'C, depositing as liquids, tars, and waxes. Thus, application of the invention obviates many maintenance problems currently challenging such plants.

A further advantage is provided in that there is a zonal separation of the activation and pyrolysis steps which permits a separation of the pyrolysis vapors from the activation off-gas. The activation off-gases are rich in carbon monoxide and hydrogen and are higher valued than the pyrolysis vapors. The activation off-gases can be readily converted to hydrogen which could be sold directly or converted to organic ammonia or urea at a premium price.

A further advantage of the present invention is that the ratio of carbon input to energy production is flexible through the use of auxiliary powdered solid or gaseous fuel and through the potential separation of the drying, pyrolysis, and activation steps. Thus, power production can be ramped up extremely quickly, faster than bringing a gas turbine on-line, thus allowing a biomass-fueled steam/electric power plant according to the invention to act as a peaking plant as well as a baseline plant.

A still further advantage of the present invention is that the ash carried into the process with the carbonaceous feed is nearly all carried out of the process as a component of the activated carbon product. Thus, bottom ash and flyash are substantially reduced.

Apparatus in accordance with the invention includes a housing in which is disposed a boiler that includes apparatus for heating water to produce steam and a single combustion zone The combustion zone is disposed below the apparatus for heating water that produces steam within the housing. The apparatus includes apparatus for delivering steam from the boiler to an associated turbine and additional apparatus for moving a carbonaceous feed below the single combustion zone whereby the carbonaceous feed is sequentially dried, pyrolyzed, and activated by heat from the combustion zone and pyrolysis and activation product gases and vaporized liquids flow to the combustion zone resulting in the pyrolysis and activation product gases and vaporized liquids providing fuel for combustion in the combustion zone. In some embodiments of the invention, the apparatus may further include an emissive perforated plate disposed under the single combustion zone and above the apparatus for moving carbonaceous feed. The housing may include an apparatus to minimize the ingress of air and egress of gases and vapors from the housing. The apparatus for moving carbonaceous feed may be a horizontal conveyance apparatus. The horizontal conveyance apparatus may convey a carbonaceous feed proximate to the combustion zone at a rate of speed that results in a residence time of carbonaceous feed within the housing of at least 45 minutes. Some embodiments of the apparatus may further including apparatus for staged injection of air into the combustion zone to ensure complete combustion and to minimize the formation of nitrogen oxides. The horizontal conveyance apparatus may be selected from the group consisting of reciprocating grate bars, vibrating grates, underfed stokers, traveling grates, and an array of screw augers, and the horizontal conveyance apparatus may be obliquely disposed with respect to a horizontal plane.

It is an object of the present invention to maximize the yield of high quality activated carbon while optimizing steam production and minimizing both capital and operating costs.

It is another object of the present invention to provide an environment with minimal or zero oxygen for drying, pyrolysis, and activation.

It is yet another object of the present invention to utilize a carbonaceous feed having a relatively large particle size and to process the feed in a manner resulting in an extended residence time for char formation because it is known in the art that char yield is significantly increased by slow pyrolysis and larger particle sizes.

It is a still further object of the present invention to provide a controlled steam environment when activating char, to ensure adequate penetration of steam into the interstices of the char for regulated pore development.

It is still another object of the present invention to provide a well-mixed combustion zone where the combustible gases from char production and activation are combined with air, in a zone that is vertically separated from the char and activation reaction zones.

Yet another object of the invention is to separate the combustion zone and char reaction zone concurrently with allowing free flow of flammable gases from the char reaction zones vertically upwards to the combustion zone.

Lastly, it is an even further object of the present invention to provide thermal transparency (transmission with minimum attenuation) to facilitate radiant heat penetration into the drying, pyrolysis, and activation regions.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWING

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawing in which:

The drawing is a partially schematic depiction of one form of the method and apparatus of the present invention.

DETAILED DESCRIPTION

The present invention includes a method and apparatus for converting a solid carbonaceous feed, preferably biomass including but not limited to chipped or hogged wood and agricultural residues, as well as coal or other feedstocks, to activated carbon, prepared by controlling the particle sizes within the range of 1 to 50 mm maximum dimension. In addition, the conversion to activated carbon is achieved inside a housing also including a boiler tube set, to minimize costs, reduce carbon footprint and maximize thermal efficiency.

As it would be for any typical solid fuel-fired electric power plant, the solid carbonaceous feed material for this invention is received and unloaded at the plant site and stored, prior to feed preparation. Contingent upon the source of the feedstock, the input material may have to be dried to reduce the moisture content to less than 30% either by solar heat or by a mechanical thermal drier. Tramp material, such as dirt, fines or metal contaminants, is removed by screening, mechanical sorting or by magnetic removal. In addition, oversize fuel material, typically 2" and above, is shredded and screened to eliminate fuel processing issues.

In the case of a typical activation, such as the conversion of walnut shells into activated carbon, 46% of the fuel energy is released as gases and vapors in the pyrolysis section and a further 34% is released as gas in the activation section, while the remainder, about 20%, resides in the activated carbon. As well, essentially all of the ash content of the feedstock is retained in the activated carbon. Of the total energy released as gases and vapors, about 15% is required for heat losses, drying, pyrolysis, and activation, but mostly for the latter. The balance of the energy in the feed, about 65%, is available for power generation.

Heat for drying, pyrolysis, and activation of the solid feedstock particles is provided by radiation from the combustion of the gases produced by the process. That heat radiates to the upper layer of the feed bed and is transferred to the lower layers by thermal conduction through the particles in the feed bed. Because the combustion zone is extremely hot (above 1200° C.), and radiant heat transfer rates are proportional to the fourth power of the temperature difference between the flame and the particles, heat transfer to the upper layer of particles is exceptionally rapid. By comparison, conduction through the particles is comparatively much slower. There is, therefore, a great benefit in mixing the feed bed throughout its depth. This can be accomplished by mechanical means, such as screws with lifters, or other such devices, known to those skilled in the art.

Typically, the feed material consists of larger particles, and time is required for heat to be transferred to the interior of the solid. The particles can, therefore, be undergoing pyrolysis on the surface while drying is still occurring in the interior. Thus, the drying and pyrolysis zones are ill-defined. Because the pyrolysis reaction is usually exothermic, when pyrolysis is initiated, usually between 300 and 450° C., the reaction heat quickly permeates the drying and pyrolysis zones, with the result that the volume of material in both zones is relatively small compared with the volume of the material in the activation zone.

It is best to ensure that pyrolysis is complete and the temperature of the feed bed is above 600° C. before steam is injected into the activation zone. Thus, the pyrolysis and activation zones are clearly defined. Activation is typically a much longer process requiring at least 30 minutes and often an hour or more. The residence time is controlled in the present process by adjusting the speed of transport through the processing zones. Throughput is controlled by controlling bed depth.

The temperatures in the drying and pyrolysis zones are not overly important and need not be closely controlled except that the pyrolysis zone temperature should exceed 600° C. to ensure that pyrolysis is complete; that is, all volatile constituents are removed, leaving fixed carbon and ash in the char. Because of the high temperature in the combustion zone, this should not be an issue. The temperature of the activation zone is much more critical and should be carefully monitored to ensure the proper relationship among time, temperature and steam flow, such that the required activation is achieved. The activation will vary depending upon the feed material, but it can be controlled by the geometry of the vessel and the flow of inert gas such as recirculated rich gaseous products of combustion or even recirculated activation off-gas.

In an embodiment of the invention, shown in the drawing, a boiler 100 includes a combustion zone 107 and radiant and convection sections 121. A single housing encompasses the boiler 100 as well as a lower region 124 surrounding a horizontal conveyance means 105. Prepared solid carbonaceous feed 101 is introduced onto a horizontal conveyance means 105 that is within the lower region 124 of housing 102, for the purpose of converting the feed material 101 into activated carbon 103. The ingress area 104 for feeding the solid carbonaceous feed onto the horizontal conveyance means 105 is also designed to ensure a controlled, even feed across the horizontal conveyance means 105. Such devices are well known to those skilled in the art. While on the horizontal conveyance means 105, the feed material is exposed to radiant heat 106 from the combustion zone 107 disposed above the horizontal conveyance means 105. Those skilled in the art will recognize that horizontal conveyance means 105 may be any grate known in the art, such as, but not limited to, reciprocating grate bars, vibrating grate, underfed stoker, an array of screw augers, and/or traveling grate. Those skilled in the art will recognize that retrofit embodiments of the present invention, intended to modify an existing boiler 100, include the installation of the horizontal conveyance means 105 or modifying an existing grate to serve as horizontal conveyance means 105.

The lower region 124 of housing 102 where transport and reaction of the feed material occurs is preferably completely sealed except for a transfer of a small amount of air in the interstices of feed particles at ingress area 104 and a small quantity of gases transferred out at discharge 115 with the activated carbon product. The minimization of the ingress of air and egress of gases and vapors in the lower region 124 of housing 102 is important to fully utilize combustible gases produced in the activated carbon production as well as to avoid the dangers inherent in leaks of combustible/explosive gases. Recirculated flue gas (an inert and non-combustible gas) can be utilized to purge both the incoming feed 101 of air and the outgoing activated carbon 103 of combustible gases and vapors.

The solid carbonaceous feed 101 and reaction products are conveyed at a rate of speed such that the total residence time of solids within the housing 102 is at least 45 minutes. The solid carbonaceous feed 101 is transported by horizontal conveyance means 105, sequentially passing through a drying zone 109, a pyrolysis zone 111, and an activation zone 113. Thus, as the solid carbonaceous feed 101 is transported in this manner the feed 101 is first exposed to radiant heat 106, causing the release of water 108 in the drying zone 109. Inert gas 110, which may be a portion of recirculated gaseous products of combustion, may be injected below the drying zone 109 to provide additional heat, to minimize the impact of radiant heat on the horizontal conveyance means 105, and to produce a low or zero oxygen environment.

The then dried carbonaceous feed 101 is further conveyed by the horizontal conveyance means 105 to the pyrolysis zone 111 where it is exposed to further radiant heat 106 and carbonization is initiated. The carbonization reaction is exothermic and it self-propagates throughout the dried carbonaceous feed thereby producing char, which remains on the horizontal conveyance means 105, and pyrolysis product gases and vaporized liquids 112, which rise into the combustion zone 107 where they are ignited and contribute to producing the radiant heat 106 necessary for drying, initiation of pyrolysis, and activation. To ensure stable combustion, the cross-sectional area of the combustion zone 107 is generally smaller than the cross-sectional area of the horizontal conveyance means 105.

The char produced in the pyrolysis zone 111 is further conveyed by horizontal conveyance means 105 to activation zone 113. In the activation zone 113, a controlled flow of reactant gas 114, which can be low pressure steam from the boiler system and/or turbine, or any other mild oxidation agent such as carbon dioxide, is introduced underneath the horizontal conveyance means 105 proximate to the activation zone 113 to activate the char to an Iodine Number of 600 or greater.

While it is generally accepted that oxygen gas should be excluded from the activation zone, there are activation conditions known in the art where combinations of reduced temperature and low oxygen concentration can be beneficial. The present invention includes such embodiments.

Activation product gases and vaporized liquids 122, commingled with pyrolysis product gases and vaporized liquids 112, rise to the combustion zone 107, where they are ignited and contribute to producing radiant heat 106. The activated carbon product enters a discharge zone 115. The discharge zone 115 is designed to prevent the ingress of air and minimize the egress of gases and vapors. The discharge zone 115, in various embodiments, utilizes a sealing screw, a rotary valve, a lock hopper, a sealed water tank, or other such means well known to those skilled in the art.

It will be understood that the egress of gases and vapors from the conveyance zone 124 to the ambient is hazardous because such gases are flammable and/or explosive. Such gases will in the normal operation of the apparatus of the present invention rise to the combustion zone 107. In the combustion zone 107, the gases synergistically constitute a fuel that burns to augment the overall process.

Primary air 116 is injected into the combustion zone 107 via a system of nozzles 117 to intensify mixing, ensure stable combustion, and produce radiant heat. To further facilitate stable combustion, nozzles 117 can be installed tangentially to the wall of housing 102. The gaseous products of combustion 118 continue to flow upward where they are mixed with secondary air 119 through another series of nozzles 120 which ensure complete combustion and minimize the formation of nitrogen oxides. The gaseous products of complete combustion are then transported through the radiant and convection sections 121 of the housing 102, where high pressure, superheated steam is produced within the boiler tubes. The steam is then piped to a conventional turbine/generator to produce electricity for use in the plant and for export. A small quantity of low-pressure steam 114 is extracted from the low-pressure stage of the steam turbine for use in activation of the char in activation zone 113. A flue (not shown) allows exit of exhaust gases from the housing 102.

An auxiliary burner 125, fueled by natural gas, propane, or other appropriate fuel, provides heat to the boiler system during start-up or other condition when the production of pyrolysis and activation gases and vaporized liquids is insufficient to sustain the heat demand of the overall process.

In alternative embodiments of the invention, the lower region 124 of the housing 102 of existing-biomass fueled steam/electric power plants is modified to serve the functions described hereinabove. In the case of plants featuring a horizontal conveyance means 105 in the form of a traveling grate, the under-grate combustion air is re-directed to nozzle assemblies 119 to serve as primary combustion air 120, and the former under-grate nozzle assemblies can be used as needed to inject inert gas 110 and reactant gas 114. Nozzle assemblies are provided for admitting inert gas 110, preferably recirculated gaseous products of combustion, beneath the grate in the drying and pyrolysis zones, and nozzle assemblies are installed for admitting reactant gas 114, preferably low-pressure steam, beneath the grate in the activation zone. In the case of plants having a fluidized bed boiler system, modified to serve the functions described hereinabove, the existing gas distributor plate can comprise an immovable perforated plate grate, but either replaced with a traveling grate, or modified by adding un-enclosed screw auger(s) to facilitate conveyance of the solid carbonaceous feed and reaction products across the grate and thus constituting horizontal conveyance means 105. Also, the fluidization air is re-directed to combustion zone 107, thus serving as primary combustion air 120. For both of the above basic types of existing plants, the existing feed and ash discharge means are modified to meet the new feed distribution and activated carbon discharge requirements.

One major advantage of the invention is its process flexibility. This flexibility leads to other embodiments of the invention, such as the following:

(1) Power production is increased, in some embodiments, by adding burners for natural gas or even pulverized solid fuel to supplement the fuel value of the pyrolysis and activation gases and vaporized liquids while maintaining a constant activated carbon production rate. Alternatively, the activated carbon production rate can be reduced by lowering the feed rate of the solid carbonaceous feed and limiting the heat released in the radiant zone by curtailing primary air and compensating with increased secondary air. In addition, activated carbon production rate can be increased by pre-drying the solid carbonaceous feed so that the radiant heat no longer required for drying can be used to increase the throughput rate of the pyrolysis and activation zones, or by pre-drying and pyrolyzing the solid carbonaceous feed by conventional means prior to introduction into the housing 102, with only activation occurring within the housing 102. Alternatively, the speed and loading of the horizontal conveyance means 105 can be adjusted to alter the residence time so that carbonization is complete as the char exits the housing 102, the char then converted to activated carbon by conventional means. Thus, it is possible to significantly change plant configuration and capacity with only a modest capital expenditure.

(2) In another embodiment, the lower region 124 of the enclosure 102 is enclosed on top but below combustion zone 107 with a perforated radiant roof or plate 123, permitting essentially unrestricted flow of the pyrolysis and activation gases and vaporized liquids 112 and 122 upwards into the combustion zone 107 and acting as a flame holder and carbonization enclosure, while maintaining sufficient thermal radiation for drying, decomposition and activation of the feed 101. The roof or plate 123 preferably has an emissivity that materially radiates heat downward. Emissivity is defined as the ratio of the energy radiated from a material's surface to that radiated from a perfect emitter, known as a blackbody, at the same temperature and wavelength and under the same viewing conditions. The roof or plate 123 is flat or domed, as required, to maximize radiation to the materials on the horizontal conveyance means 105.

The description herein has emphasized the apparatus in accordance with the present invention. Those skilled in the art will recognize that the present invention also includes related methods.

One such method is the method of producing activated carbon and steam within the same housing which includes:
providing a housing;
providing a boiler that includes a combustion zone within the housing;
providing a radiant and convection section of the housing above the combustion zone;
providing a horizontal conveyance zone beneath the combustion zone
providing within the horizontal conveyance zone apparatus for conveying a solid carbonaceous feed between a point of introduction into the housing to a point of discharge from the housing;
providing apparatus for minimizing leakage of gases and vapors into or out of the housing;
burning combustible gases, vaporized liquids, and auxiliary fuels as needed, in the combustion zone;
exposing radiant heat from the combustion zone to the apparatus for conveying in the conveyance zone including sequentially a drying zone, a pyrolysis zone, and an activation zone in the apparatus for conveying;
injecting air into the combustion zone;
injecting secondary air above the combustion zone to mix the products of combustion occurring in the combustion zone to ensure full combustion;
transporting gaseous products of combustion from the combustion zone to the radiant and convection sections to transfer heat to produce steam to drive a turbine that drives a generator;
exposing the solid carbonaceous feed to an inert gas in the drying and pyrolysis zones;
exposing the solid carbonaceous feed to a reactant gas in the activation zone selected from the group consisting of steam, carbon dioxide, and other mild oxidizing gases; and
allowing pyrolysis and activation product gases and vaporized liquids to rise from the horizontal conveyance zone to the combustion zone to be ignited to produce radiant heat and to augment continuing the process.

In some embodiments, the method includes the step of providing an auxiliary burner to provide heat to the combustion zone during start-up or other condition when the production of pyrolysis and activation gases and vaporized liquids is insufficient to sustain the heat demand of the overall process.

The method may further include providing a perforated plate above the horizontal conveyance zone and below the combustion zone and extending horizontally essentially across the entire area of the combustion zone, permitting essentially unrestricted upward flow of the pyrolysis and activation gases and having an emissivity sufficient to materially impact radiation of heat downwards to the horizontal conveyance zone.

The step of providing within the horizontal conveyance zone apparatus for conveying a solid carbonaceous feed between a point of introduction into the housing to a point of discharge from the housing may include providing an apparatus for conveying selected from the group consisting of reciprocating grate bars, vibrating grates, underfed stokers, an array of screw augers, and traveling grates. The method may further include the step of providing an emissive perforated plate disposed under the combustion zone and above the apparatus for conveying a solid carbonaceous feed.

The step of providing within the horizontal conveyance zone apparatus for conveying a solid carbonaceous feed between a point of introduction into the housing to a point of discharge from the housing may include providing an apparatus for conveying that conveys carbonaceous feed proximate to the combustion zone at a rate of speed that results in a residence time of carbonaceous feed within the housing of at least 45 minutes. The method may also include the step of providing apparatus for injecting air into the combustion zone to ensure complete combustion and to minimize the formation of nitrogen oxides.

Still other embodiments of the present invention relate to a method for retrofitting an existing solid fuel-fired steam/electric power plant having a boiler having a combustion zone disposed below a radiation and convection section for producing superheated steam which includes: providing an elongated apparatus for transferring a carbonaceous material below and proximate to the combustion zone, where the elongated apparatus has 1st and 2nd extremities; providing a carbonaceous feed port in the housing proximate to a 1st extremity of the apparatus for transferring a carbonaceous material; providing a discharge port in the housing proximate to a 2nd extremity of the apparatus for transferring a carbonaceous material; providing a carbonaceous feed mechanism at the 1st port; providing a discharge mechanism at the 2nd port; drying and pyrolyzing a carbonaceous material and activating the resulting char on the apparatus for transferring a carbonaceous material below and proximate to the combustion zone; allowing pyrolysis and activation product gases and vaporized liquids to rise to the combustion zone to fuel subsequent combustion in the combustion zone; providing apparatus for minimizing (1) the ingress of air into the housing proximate to the elongated apparatus for transferring a carbonaceous material that would compromise pyrolysis and (2) the egress of pyrolysis gases and vaporized liquids and activation product gases and vaporized liquids from the housing that would limit the heat produced in the combustion zone and create a potentially combustible, explosive and poisonous environment outside the boiler housing, and whereby heat produced in the combustion zone is utilized for (a) the production of steam for the generation of electric power as well as (b) to dry, pyrolyze, and activate carbonaceous material to form activated carbon.

This method may further including the step of providing an auxiliary burner to provide heat to the combustion zone during start-up or other condition when the production of pyrolysis and activation gases and vaporized liquids is insufficient to sustain the heat demand of the overall process. Some embodiments may further include providing a perforated plate above the horizontal conveyance zone and below the combustion zone and extending horizontally essentially across the entire area of the combustion zone, permitting essentially unrestricted upward flow of the pyrolysis and activation gases and having an emissivity sufficient to materially impact radiation of heat downwards to the horizontal conveyance zone. Other embodiments may include the step of providing within the horizontal conveyance zone apparatus for conveying a solid carbonaceous feed between a point of introduction into the housing to a point of discharge from the housing includes providing an apparatus for conveying selected from the group consisting of reciprocating grate bars, vibrating grates, underfed stokers, an array of screw augers, and traveling grates.

The method may include a step of providing within the horizontal conveyance zone apparatus for conveying a solid carbonaceous feed between a point of introduction into the housing to a point of discharge from the housing that includes providing an apparatus for conveying that conveys carbonaceous feed proximate to the combustion zone at a rate of speed that results in a residence time of carbonaceous feed within the housing of at least 45 minutes. Additionally, the method may include the step of providing apparatus for injecting air into the combustion zone to ensure complete combustion and to minimize the formation of nitrogen oxides.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an imager" should typically be interpreted to mean "at least one imager"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two images," or "a plurality of images," without other modifiers, typically means at least two images). Furthermore, in those instances where a phrase such as "at least one of A, B. and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms or both terms. For example, the phrase "A or B" will be understood to include the possibilities of "A" or "B" or "A and B."

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component or method step is explicitly recited in the claims. No claim element herein is to be construed under the provisions of 35 U.S.C. 112, sixth paragraph, unless the element is expressly recited using the phrase "means for."

What is claimed is:
1. Apparatus which comprises:
  a housing;
  a boiler that includes means for heating water to produce steam and a single combustion zone, said combustion zone being disposed below said means for heating water to produce steam within said housing;
  means for injecting air and/or oxygen into said combustion zone;
  means for delivering steam from said boiler to an associated turbine;

means for moving a carbonaceous feed into said housing and activated carbon product out of said housing and located below said single combustion zone whereby said carbonaceous feed is sequentially dried, pyrolyzed, and activated by radiant heat from said combustion zone, and pyrolysis and activation product gases and vaporized liquids flow unrestricted upwards into said combustion zone resulting in said pyrolysis and activation product gases and vaporized liquids providing fuel for combustion in said combustion zone;

means to minimize the ingress of air and egress of gases and vapors from said housing by delivering inert gases below said means for moving carbonaceous feed, said inert gases flowing upwards through said carbonaceous feed in the areas where drying and pyrolysis occurs;

means for delivering steam or other gas with mild oxidative properties below said means for moving carbonaceous feed, said steam or other gases with mild oxidative properties flowing upwards through said carbonaceous feed in the area where activation occurs.

2. The apparatus as described in claim 1 further including an emissive perforated plate disposed under said single combustion zone and above said means for moving carbonaceous feed.

3. The apparatus as described in claim 1 wherein said means for moving carbonaceous feed is a horizontal conveyance apparatus.

4. The apparatus as described in claim 3 wherein said horizontal conveyance apparatus conveys said carbonaceous feed at a rate of speed that results in a residence time of said carbonaceous feed within said housing of at least 45 minutes.

5. The apparatus as described in claim 3 wherein said horizontal conveyance apparatus is obliquely disposed with respect to a horizontal plane.

6. The apparatus as described in claim 3 wherein said horizontal conveyance apparatus is selected from the group consisting of reciprocating grate bars, vibrating grates, underfed stokers, un-enclosed screw augers, and traveling grates.

* * * * *